United States Patent Office 2,842,582
Patented July 8, 1958

2,842,582
LONG-CHAIN DITHIOLS AND THEIR PREPARATION

Edward L. Jenner, Wilmington, Del., assignor to E. I. du Pont de Nemours and Company, Wilmington, Del., a corporation of Delaware No Drawing. Application January 5, 1955
Serial No. 480,069

13 Claims. (Cl. 260—455)

This invention relates to new aliphatic dithiols and certain derivatives thereof, and to a new process for the preparation of such dithiols and dithiol derivatives by the additive coupling of ethylenically unsaturated compounds.

Polyfunctional organic compounds have achieved considerable importance in technical organic chemistry in recent years. For example, glycols, dibasic acids, diamines, etc., have utility in the preparation of polymers or in the modification of properties of polymers. Compounds containing sulfhydryl groups are also useful in condensation reactions and dithiol compounds can be useful in the preparation of polymers. Sulfur-containing organic compounds are of use as modifiers in addition polymerization, e. g., in the polymerization of dienes to produce superior synthetic rubbers. Thiols are readily oxidized to products of use as surface active agents. Ethylenically unsaturated compounds which contain a plurality of sulfide or thiol groups capable of use in such applications as described above, and particularly those that also have ethylenic unsaturation present, are a valuable addition to organic chemistry. The process for the preparation of such novel products has considerable importance.

It is an object of this invention to provide a new and improved process for the additive coupling of ethylenically unsaturated compounds.

It is another object of this invention to provide a process for the production of aliphatic dithiols and certain dithiol derivatives by the coupling of ethylenically unsaturated compounds having conjugated unsaturation.

It is a further object to provide new aliphatic dithiols and certain derivatives of dithiols which have the general formula

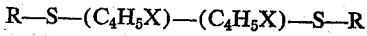
R—S—(C$_4$H$_5$X)—(C$_4$H$_5$X)—S—R wherein X is a substituent from the group consisting of hydrogen, halogen and hydrocarbon, and R is a substituent from the group consisting of hydrogen, hydrocarbon, carboxy-hydrocarbon and acyl.

Other objects of the invention will appear hereinafter.

The objects of this invention may be accomplished by reacting a polymerizable ethylenically unsaturated compound having conjugated unsaturation with a sulfhydryl compound in the presence of an oxidizing agent from the group consisting of hydroxyl free-radicals and ceric salts. By this reaction new compounds of the general formula

R—S—(C$_4$H$_5$X)—(C$_4$H$_5$X)—S—R are obtained wherein (C$_4$H$_5$X) is a unit of a diene with X being a constituent of the group consisting of hydrogen, halogen or hydrocarbon, and R is a substituent of the group consisting of hydrocarbon, carboxyhydrocarbon or acyl. Hydrolysis of the acyl groups results in the formation of the dithiol, i. e., where R is hydrogen.

The reaction of this invention is brought about by the use of an aqueous medium and generally in the presence of a water-soluble organic solvent whose presence does not interfere with the preparation of the products of this invention. In this reaction the sulfhydryl compound and the ethylenically unsaturated compound react in equimolar ratios and are each generally present in the reaction medium in substantial amounts.

The following examples are given to illustrate, in detail, the practice of the process of this invention. The parts refer to parts by weight.

Example I

A solution was prepared, in a reaction vessel equipped with an efficient agitator and a cooling bath, from 1500 parts of water, 779 parts of tert.-butyl alcohol, and 46 parts of sulfuric acid. Butadiene was introduced at the rate of 5 parts/min. for a fourteen minute period during which the following three solutions were added simultaneously and equivalently: solution 1, 278 parts of ferrous sulfate heptahydrate, 575 parts of water, and 98 parts of sulfuric acid; solution 2, 34 parts of hydrogen peroxide in 125 parts of water; and solution 3, 92 parts of thioglycolic acid in 80 parts of water. The mixture was maintained at a temperature of 5° C. during addition. The mixture was extracted with two portions of 1000 parts each of ether and the combined extracts were dried over magnesium sulfate. The ether, tert.-butyl alcohol, and thioglycolic acid were distilled to a pot temperature of 144° C. at a pressure of 2 mm. The residue, an isomeric mixture containing 3,12-dithiatetradecadienedioic acid, comprised 114 parts.

*Analysis.*—Calcd. C$_{12}$H$_{18}$O$_4$S$_2$: C, 49.64; H, 6.25; S, 22.08; N. E., 145. Found: C, 48.53; H, 6.50; S, 22.79; N. E. 161.

Example II

A rapid stream of butadiene (5 parts per minute) was passed into a solution of 1170 parts of tert.-butyl alcohol and 46 parts of sulfuric acid in 1000 parts of water for 36 minutes while the following two solutions were added simultaneously and equivalently: solution 1, 46 parts of thioglycolic acid in 215 parts of water, and solution 2, 306 parts of ceric sulfate, Ce(HSO$_4$)$_4$, in 1000 parts of water. The mixture was maintained at 30° C. during addition period. The reaction mixture was extracted with two portions of ether (1000 parts each) and the combined ether extracts were dried over magnesium sulfate. Distillation of the ether, tert.-butyl alcohol and thioglycolic acid to a pot temperature of 100° C. at 1 mm. left a residue of 41 parts. This material was a mixture of isomers containing 3,12-dithiatetradecadienedioic acid.

*Analysis.*—Calcd. for C$_{12}$H$_{18}$O$_4$S$_2$: C, 49.63; H, 6.25; S, 22.08; N. E., 145. Found: C, 53.32; H, 6.78; S, 21.14; N. E., 165.

This crude acid was separated from nonacidic contaminants by dissolving the product in aqueous sodium hydroxide, extracting the alkaline solution three times with ether and then reacidifying the solution to liberate the free acid which was isolated as described above. The thus purified acid had the following analysis:

Found: C, 50.96; H, 6.57; S, 21.71; N.E. 155.

Example III

Butadiene at the rate of 5 parts per minute was introduced into a solution prepared from 779 parts of tert.-butyl alcohol, 46 parts of sulfuric acid and 1500 parts of water for fifteen minutes while the following three solutions were added simultaneously and equivalently: solution 1, 278 parts of ferrous sulfate heptahydrate, 98 parts of sulfuric acid, and 575 parts of water; solution 2, 34 parts of hydrogen peroxide and 125 parts of water; solution 3, 76 parts of thiolacetic acid, CH₃COSH, and 62 parts of tert.-butyl alcohol. The reaction was conducted at 0° C. At the conclusion of the addition, the mixture was extracted twice with 1000-part portions of ether and the extracts were dried over magnesium sulfate. The ether was distilled and the product obtained by fractional distillation at reduced pressure. The principal fraction, B. P., 130–145° C. at 1 mm., comprised 56 parts and had a refractive index, $n_D^{25}$, 1.529. This material is an isomeric mixture containing the diacetyl derivative of 2,6-octadiene-1,8-dithiol.

*Analysis.*—Calcd. for $C_{12}H_{18}O_2S_2$: C, 55.78; H, 7.02; S, 24.82. Found: C, 56.49; H, 7.25; S, 25.31.

*Example IV*

Butadiene at a rate of 2 parts per minute was introduced into a solution of 1000 parts of water and 1170 parts of tert.-butyl alcohol while the following two solutions were added simultaneously and equivalently: solution 1, 269 parts of ceric perchlorate and 630 parts of perchloric acid in approximately 800 parts of water; and solution 2, 38 parts of thiolacetic acid, CH₃COSH, in 358 parts of tert.-butyl alcohol. The mixture was held at 30° C. during the twenty-nine minutes required for the addition. At the end of the addition period, the mixture was extracted with two 800-part portions of benzene and the extracts were dried over magnesium sulfate. The benzene was distilled and the product was then obtained by distillation at reduced pressure. A fraction, B. P. 136–155° C./1 mm., $n_D^{25}$, 1.530, which comprised 38.5 parts was obtained. This material contained the diacetate of 2,6-octadiene-1,8-dithiol.

*Analysis.*—Calcd. of $C_{12}H_{18}O_2S_2$: C, 55.78; H, 7.02; S, 24.82. Found: C, 55.82; H, 7.00; S, 25.09.

*Example V*

Butadiene at the rate of 5 parts per minute was introduced into a solution of 1560 parts of tert.-butyl alcohol and 1000 parts water. Over a fourteen minute period during which the mixture was maintained at a temperature of 30° C., the following two solutions were introduced: solution 1, 264 parts of ceric sulfate, Ce(HSO₄)₄, in approximately 600 parts of water; and solution 2, 43 parts of ethyl mercaptan in 98 parts of tert.-butyl alcohol. (Twelve percent of the ethyl mercaptan solution was added at the start and the remaining 88% was added equivalently and simultaneously with the ceric sulfate solution.) The reaction mixture was extracted twice with 500-part portions of benzene and the combined extracts were washed with water and dried over magnesium sulfate. The benzene was distilled at atmospheric pressure and the product was then distilled at reduced pressure whereupon an isomeric mixture containing 3,12-dithiatetradecadiene, 12.6 parts, B. P. 105–140° C. at 1 mm., $n_D^{25}$, 1.5163, was obtained.

*Analysis.*—Calcd. for $C_{12}H_{22}S_2$: C, 62.6; H, 9.6; S, 27.8; mol. wt., 230. Found: C, 61.7; H, 9.6; S, 27.0; mol. wt., 220.

In addition to the above-cited dithiol derivative, there was obtained 6.3 parts of an unsaturated hydroxy sulfide, B. P., 40–41° C./1 mm. On the basis of elemental analysis, molecular weight, and infrared spectrum, this compound was assigned the following structure:

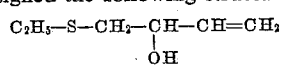

*Example VI*

The reaction vessel was charged with a solution of 46 parts of sulfuric acid and 779 parts of tert.-butyl alcohol in 1500 parts of water. Over a ten minute period during which the mixture was maintained at a temperature of 25° C., the following three solutions were added: solution 1, 26 parts of acrylonitrile in 91 parts of tert.-butyl alcohol; solution 2, 38 parts of thiolacetic acid and 89 parts of tert.-butyl alcohol; and solution 3, 255 parts of ceric sulfate, Ce(HSO₄)₄, in approximately 650 parts of water. At the end of the reaction period, the mixture was extracted with four 500-part portions of benzene. The organic extract was washed with aqueous sodium bicarbonate solution and dried over magnesium sulfate. The product was isolated by distilling the benzene and the volatile reactants to a pot temperature of 95° C. at 1 mm., whereupon a residue of 47 parts was obtained. This product is the diacetyl derivative of 2,3-dicyanobutane-1,4-dithiol.

*Analysis.*—Calcd. for $C_{10}H_{12}S_2O_2N_2$: C, 46.8; H, 4.7; S, 25.0. Found: C, 46.0; H, 5.2; S, 25.2.

In the practice of this invention any ethylenically unsaturated compound subject to addition polymerization and having conjugated unsaturation may be employed, preferably those containing not more than 10 carbon atoms. Particularly useful are the ethylenically unsaturated compounds of three to eight carbon atoms, and preferred are those having two ethylenic double bonds in a conjugated system. Useful compounds include acrylonitrile, styrene, 1,3-butadiene or 2-halo-1,3-butadienes, including 2-fluoro- and 2-chlorobutadiene. In general, the diene hydrocarbons of four to five carbon atoms, e. g., butadiene and isoprene, are most useful.

The sulfhydryl compounds that are employed with the conjugated ethylenic compound have an SH group attached to carbon and generally have up to six carbons. The compounds have the general formula R—SH wherein R is preferably a lower aliphatic group (one to six carbons) and, except for sulfur and optionally, oxygen, is hydrocarbon. The sulfhydryl, or thiol, compounds employed preferably have only one sulfhydryl group. Examples of sulfhydryl compounds useful in the reaction of this invention are the mercaptans (R—SH, wherein R is hydrocarbon), such as methyl mercaptan, butyl mercaptan, cyclohexyl mercaptan and thiophenol; mercaptoacids, such as thioglycolic acid and mercaptobutyric acid; and sulfhydryl compounds containing an acyl group as in thiolacetic acid, and thiolbutyric acid.

The oxidizing agent employed in the reaction of this invention is one that brings about the conversion of a mercaptan, RSH, into the corresponding free radical, RS·, from which the thiol hydrogen has been removed. Suitable oxidizing agents include hydroxyl free-radicals and ceric salts.

The hydroxyl free-radical employed in the reaction of this invention is suitably provided by generating it from an inorganic peroxide that will yield hydrogen peroxide under acidic conditions or from hydrogen peroxide itself and a reducing agent such as an inorganic salt having oxidizable ions of a metal of Series 4 of the Periodic Table and of atomic number 22 to 26, for example, a substance yielding ferrous, titanous, or vanadous ions. An alternative method for furnishing hydroxyl free-radicals is by employing radiant energy on hydrogen peroxide in water. A further method is by the use of oxygen with ferrous (+2) or cerous (+3) ions. To obtain efficient use of the hydroxyl free-radicals, it is desirable that their relative concentration in the reaction mixture be low at any time in view of their high activity and short life. Accordingly, the aqueous solutions containing the peroxide and the reducing agent, that is, oxidizable ions, are preferably added gradually and mixed in the reaction mixture in the presence of the sulfhydryl compound and the ethylenically unsaturated compound. The total amount of hydroxyl free-radicals supplied to the reaction mixture may vary between wide limits, preferably, however, they should be supplied in molar ratios of said unsaturated compound to hydroxyl radical of between 1:1.5 and 5:1.

In addition to hydroxyl free-radical, the reaction of this invention can be effected by the use of ceric salts, for example, ceric sulfate, ceric perchlorate or other inorganic ceric (IV) salts having a water solubility of at least 1%. The oxidizing agent is employed in the reaction in substantially molar ratios to that of the desired product rather than in catalytic amounts.

The reaction of this invention is brought about in an aqueous medium. The amount of water present in the reaction mixture should not exceed one hundred times the weight of the organic compounds present. When larger amounts of water are present, the concentration of organic compound is low and the yield of difunctional compound is decreased. Preferably, weight ratios of water to organic compounds of less than 30:1 and generally less than 10:1 are used. The optimum amount of water to be used is dependent upon the specific reactants employed. When a highly water-soluble organic system is employed, the amount of water can be reduced to 1:1 or even as low as 0.1 to 1.0.

The aqueous reaction mixture is preferably acidic, e. g., the pH of the reaction media is generally below 7, and in some cases below 2.

In addition to water, water-soluble organic solvents can be present. The use of such solvents tends to make the reaction system more homogeneous. Examples of such solvents include methyl alcohol, tert.-butyl alcohol and dioxane. The solvents under some conditions may react with hydroxy radicals and certain oxidizing agents; however, the thiol compounds react at a much more rapid rate and when the latter are present, the reaction involves them to the substantial exclusion of the solvent present. The amount of solvent present is generally not more than that of the amount of water employed and preferably is between one-tenth and one-half of the total amount of water.

The reaction time is not critical but generally requires at least ten minutes for the addition of the hydroxyl free-radical generating solution to the organic compound. Suitable temperatures for the reaction vary from −30° to 60° C. with the preferred temperature dependent upon the particular system used.

The coupled products and particularly the difunctional products are isolated by any suitable technique depending upon the properties of the substances obtained. In general, the isolation involves extraction of a product from the water and inorganic materials. Distillation, crystallization or precipitation may be employed in the isolation and purification of the products obtained. The coupled products obtained can be represented by the general formula

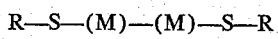
R—S—(M)—(M)—S—R wherein M is the unit of the polymerizable ethylenically unsaturated monomers containing conjugated unsaturation and R is generally an aliphatic group of up to six carbons.

Particularly preferred products are those having the formula

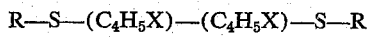
R—S—(C₄H₅X)—(C₄H₅X)—S—R wherein X is hydrogen, halogen (fluorine, chlorine, bromine, or iodine), or lower alkyl, and R is hydrocarbon, carboxy hydrocarbon or acyl groups of up to six carbons. These compounds include those of the structure

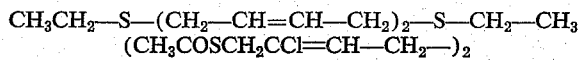
CH₃CH₂—S—(CH₂—CH=CH—CH₂)₂—S—CH₂—CH₃
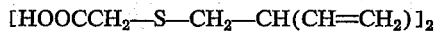
(CH₃COSCH₂CCl=CH—CH₂—)₂ and

[HOOCCH₂—S—CH₂—CH(CH=CH₂)]₂

The products obtained by the process of this invention can be used in the preparation of polymers which may be drawn into useful fibers similar to nylon fibers, for example, the dicarboxylic acid obtained when thioglycolic acid is employed (see Examples I and II) can be condensed with diamines such as hexamethylenediamine to produce sulfur containing polyamides having carbon-to-carbon unsaturation. The difunctional compound obtained through the use of thiolacetic acid (Examples III and IV) can be hydrolyzed to give the dithiol (R in the preceding formula is H) which condenses with dibasic acids to give sulfur-containing polymers. Furthermore, the dithiol, such as octamethylene dithiol, will react with a non-conjugated diolefin, such as biallyl, to give high molecular weight polymers. The dithiols are also useful in the modification of addition polymerizations, or for metal complexing agents, or in the preparation of surface active agents.

Since it is obvious that many changes and modifications can be made in the above-described details without departing from the nature and spirit of the invention, it is to be understood that the invention is not to be limited to said details except as set forth in the appended claims.

I claim:

1. A process for the additive coupling of polymerizable ethylenically unsaturated compounds with sulfhydryl compounds to produce dithiols and derivatives thereof which comprises reacting in an aqueous system, in the presence of an oxidizing agent taken from the group consisting of hydroxyl free-radicals and ceric salts in molar ratio to that of said sulfhydryl compound, a polymerizable ethylenically unsaturated compound having not to exceed ten carbon atoms and having conjugated unsaturation with a sulfhydryl compound having the formula R—SH wherein R is a substituent of the group consisting of hydrocarbon of not to exceed six carbon atoms, monocarboxy hydrocarbon of not to exceed six carbon atoms, and carboxyacyl of not to exceed six carbon atoms.

2. A process for the additive coupling of polymerizable ethylenically unsaturated compounds with sulfhydryl compounds to produce dithiols and derivatives thereof which comprises reacting in an aqueous system in the presence of an oxidizing agent taken from the group consisting of hydroxyl free-radicals and ceric salts in molar ratio to that of said sulfhydryl compound, a polymerizable ethylenically unsaturated compound of three to eight carbon atoms having conjugated unsaturation with a sulfhydryl compound having the formula R—SH wherein R is a substituent of the group consisting of hydrocarbon of not to exceed six carbon atoms, monocarboxy hydrocarbon of not to exceed six carbon atoms, and carboxylacyl of not to exceed six carbon atoms.

3. A process as defined in claim 2 in which the polymerizable ethylenically unsaturated compound contains two ethylenic double bonds in a conjugated system.

4. A process as defined in claim 3 in which the sulfhydryl compound is one taken from the group consisting of mercaptans, mercaptocarboxylic acids and carbothiolic acids.

5. A process as defined in claim 2 in which the polymerizable ethylenically unsaturated compound is a diene hydrocarbon of four to five carbon atoms.

6. A process as defined in claim 5 in which the sulfhydryl compound is one taken from the group consisting of mercaptans, mercaptocarboxylic acids and carbothiolic acids.

7. A composition of matter having the general formula

R—S—(C₄H₅X)—(C₄H₅X)—S—R wherein X is a monovalent substituent from the group consisting of hydrogen, halogen and hydrocarbon of not to exceed six carbon atoms and R is a substituent of the group consisting of hydrogen, hydrocarbon of not to exceed six carbon atoms, monocarboxy hydrocarbon of not to exceed six carbon atoms and carboxy acyl of not to exceed six carbon atoms.

8. A dithiol having the formula

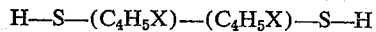
H—S—(C₄H₅X)—(C₄H₅X)—S—H wherein X is a monovalent substituent from the group consisting of hydrogen, halogen and hydrocarbon of not to exceed six carbon atoms.

9. As a new composition of matter the compound

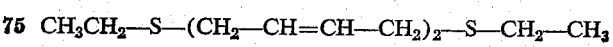
CH₃CH₂—S—(CH₂—CH=CH—CH₂)₂—S—CH₂—CH₃

10. As a new composition of matter the compound $$(CH_3COSCH_2-CCl=CH-CH_2-)_2$$

11. As a new composition of matter a compound of the formula $$HOOCCH_2-S-(C_4H_6)-(C_4H_6)-S-CH_2COOH$$

12. A composition of matter having the formula $$CH_3CO-S-(C_4H_5X)-(C_4H_5-X)-S-COCH_3$$

wherein X is a monovalent substituent from the group consisting of hydrogen, halogen and hydrocarbon of not to exceed six carbon atoms.

13. As a new composition of matter the compound $$(CH_3COSCH_2-CH=CH-CH_2)_2$$

References Cited in the file of this patent
UNITED STATES PATENTS

| | | |
|---|---|---|
| 2,352,435 | Hoeffelman et al. | June 27, 1944 |
| 2,602,816 | Gregory et al. | July 8, 1952 |
| 2,626,279 | Crouch et al. | Jan. 20, 1953 |